(12) United States Patent
Awano et al.

(10) Patent No.: US 9,420,481 B2
(45) Date of Patent: Aug. 16, 2016

(54) MOBILE COMMUNICATION TERMINAL TEST SYSTEM AND MOBILE COMMUNICATION TERMINAL TEST METHOD

(71) Applicant: ANRITSU CORPORATION, Kanagawa (JP)

(72) Inventors: Takayuki Awano, Kanagawa (JP); Yusuke Otsuka, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 232 days.

(21) Appl. No.: 14/327,979

(22) Filed: Jul. 10, 2014

(65) Prior Publication Data

US 2015/0043356 A1    Feb. 12, 2015

(30) Foreign Application Priority Data

Aug. 8, 2013   (JP) .................................. 2013-165044

(51) Int. Cl.
| | |
|---|---|
| H04W 24/08 | (2009.01) |
| H04W 24/04 | (2009.01) |
| H04W 24/06 | (2009.01) |
| H04B 17/00 | (2015.01) |

(52) U.S. Cl.
CPC .......... *H04W 24/08* (2013.01); *H04B 17/0085* (2013.01); *H04W 24/04* (2013.01); *H04W 24/06* (2013.01)

(58) Field of Classification Search
None
See application file for complete search history.

(56) References Cited

U.S. PATENT DOCUMENTS

2014/0029440 A1*  1/2014  Genoud .................. H04L 5/001
                                                        370/241

OTHER PUBLICATIONS

Miki, Nobuhiko et. al., "CA for Bandwidth Extension in LTE-Advanced" In: NTT DoCoMo Technical Journal, vol. 12, No. 2 pp. 10-19, Sep. 2010.

* cited by examiner

*Primary Examiner* — Faruk Hamza
*Assistant Examiner* — Alan Lindenbaum
(74) *Attorney, Agent, or Firm* — Pearne & Gordon LLP

(57) ABSTRACT

Provided is a mobile communication terminal test system that transmits a test signal formed by a plurality of downlink component carriers including a primary component carrier (DL_CC1) and a secondary component carrier (DL_CC2) to a mobile communication terminal to test the mobile communication terminal. The mobile communication terminal test system includes a primary test device that transmits first communication data including first test data to the mobile communication terminal using the primary component carrier of the test signal and a secondary test device that transmits second communication data including second test data to the mobile communication terminal using the secondary component carrier of the test signal.

16 Claims, 4 Drawing Sheets

| HARQ-ACK(j) | | | |
|---|---|---|---|
| HARQ-ACK(0) | HARQ-ACK(1) | HARQ-ACK(2) | HARQ-ACK(3) |
| TB1 Primary cell | TB2 Primary cell | TB1 Secondary cell | TB2 Secondary cell |

| Test device | Downlink center frequency | Uplink center frequency |
|---|---|---|
| First test device | First downlink frequency | First uplink frequency |
| Second test device | Second downlink frequency | First uplink frequency |
| Third test device | Third downlink frequency | First uplink frequency |

MOBILE COMMUNICATION TERMINAL TEST SYSTEM AND MOBILE COMMUNICATION TERMINAL TEST METHOD

TECHNICAL FIELD

The present invention relates to a mobile communication terminal test system and a mobile communication terminal test method for testing a mobile communication terminal which performs communication using a plurality of component carriers.

BACKGROUND ART

In recent years, with the spreading of a broadband mobile communication service, high-speed and high-capacity communication is required and the third generation mobile communication system typified by a Wideband-Code Division Multiple Access (W-CDMA) system or a Long Term Evolution (LTE) system, which is the next-generation mobile communication system typified by a 3.5-generation mobile communication system, is used as a standard of the fourth generation communication system.

LTE is a communication standard defined by Third Generation Partnership Project (3GPP), in which a plurality of channel widths (1.4 MHz, 3 MHz, 5 MHz, 10 MHz, 15 MHz, or, 20 MHz) are defined as a standard, Orthogonal Frequency Division Multiple Access (OFDMA) is used in the downlink, and Single Carrier-Frequency Division Multiple Access (SC-FDMA) is used in the uplink. LTE requires a communication speed, such as a downlink peak data rate of 150 Mbps or more and an uplink peak data rate of 50 Mbps or more (a frequency bandwidth is 20 MHz in both cases).

In addition, LTE-Advanced (hereinafter, referred to as "LTE-A") which uses a broad band including a system band, which is the receivable bandwidth of LTE, in order to broaden the bandwidth and to increase the communication speed has been standardized.

LTE-A is characterized in that two techniques, that is, a technique for increasing the speed of a multiple-input multiple-output (MIMO) system, which is a spatial multiplexing technique, and a frequency bandwidth broadening technique (carrier aggregation), which bandwidth broadening means for aggregating LTE frequency blocks (a maximum channel bandwidth of 20 MHz) called component carriers, are adopted in order to flexibly broaden the frequency bandwidth while maintaining compatibility with LTE and each component carrier performs adaptive modulation and coding corresponding to a radio wave environment or a hybrid automatic repeat request (HARQ) to improve efficiency and the transmission speed (for example, see Non-patent Document 1).

RELATED ART DOCUMENT

Non-Patent Document

[Non-patent Document 1] NTT DOCOMO Technical Journal vol. 12 No. 2, pp. 10-19, "Special Articles on LTE-Advanced Technology-Ongoing Evolution of LTE toward IMT-Advanced-CA for Bandwidth Extension in LTE-Advanced"

DISCLOSURE OF THE INVENTION

Problem that the Invention is to Solve

However, with the progress of the research and development of LTE-A, the development of a mobile communication terminal test device corresponding to LTE-A is required. Since the structure of the mobile communication terminal test device corresponding to LTE-A is complicated, the development of the mobile communication terminal test device becomes complicated and thus, there is increase in costs. However, as described above, since LTE-A is compatible with LTE, it is considered that a mobile communication terminal test system is constructed with a simple structure in which LTE mobile communication terminal test devices corresponding to the number of component carriers are prepared and connected to the mobile communication terminal, thereby responding to LTE-A in an early stage.

However, it is difficult to achieve the mobile communication terminal test system corresponding to LTE-A only by connecting a plurality of LTE mobile communication terminal test devices.

The invention has been made in view of the above-mentioned problems and an object of the invention is to provide a mobile communication terminal test system and a mobile communication terminal test method that can test a mobile communication terminal, which performs communication using a plurality of component carriers, with a simple structure.

Means for Solving the Problem

According to a first aspect of the invention, there is provided a mobile communication terminal test system (100) that transmits a test signal having a plurality of downlink component carriers including a primary component carrier (DL_CC1) and a secondary component carrier (DL_CC2) to a mobile communication terminal (1) and tests the mobile communication terminal. The mobile communication terminal test system includes: a primary test device (10) that transmits first communication data including first test data to the mobile communication terminal using the primary component carrier of the test signal; a secondary test device (20) that transmits second communication data including second test data to the mobile communication terminal using the secondary component carrier of the test signal; first test data output means (101) for supplying the first test data to the primary test device; second test data output means (102) for supplying the second test data to the secondary test device; and test parameter setting means (11, 21) for setting test parameters including a frequency of each of the plurality of downlink component carriers and a frequency of an uplink used by the mobile communication terminal to the primary test device and the secondary test device. Each of the primary test device and the secondary test device includes receiving means (14, 24) for receiving a transmission signal including control information which is transmitted by the mobile communication terminal in the uplink. The primary test device includes first communication data processing means (14b) for performing a process corresponding to control information related to the first communication data among control information items of the control information, and the secondary test device includes second communication data processing means (24b) for performing a process corresponding to control information related to the second communication data among the control information items of the control information.

According to this structure, in the mobile communication terminal test system according to the first aspect of the invention, the primary test device receives the first test data from the first test data output means and the secondary test device receives the second test data from the second test data output means. Then, the primary test device transmits the first test data to the mobile communication terminal using the primary component carrier and the secondary test device transmits the second test data to the mobile communication terminal using the secondary component carrier.

Therefore, the mobile communication terminal test system according to the first aspect of the invention can test the mobile communication terminal, which performs communication using a plurality of component carriers, with a simple structure.

According to a second aspect of the invention, in the mobile communication terminal test system according to the above-mentioned aspect, the mobile communication terminal may transmit, as the control information, reception acknowledgement information corresponding to a received state of the first communication data and the second communication data. The primary test device may further include first throughput measurement means (15) for measuring the overall throughput of the first communication data and the second communication data in a physical layer or the throughput of each downlink component carrier on the basis of the reception acknowledgement information transmitted by the mobile communication terminal.

According to this structure, in the mobile communication terminal test system according to the second aspect of the invention, the first throughput measurement means can measure the overall throughput of each communication data item, which is transmitted to the mobile communication terminal by the primary component carrier and the secondary component carrier, in the physical layer or the throughput of each component carrier.

According to a third aspect of the invention, the mobile communication terminal test system according to the above-mentioned aspect may further include second throughput measurement means (105) that receives the first test data and the second test data transmitted from the mobile communication terminal, performs a check process related to the transmitted test data items, and measures throughput between the first and second test data output means and the mobile communication terminal.

According to this structure, in the mobile communication terminal test system according to the third aspect of the invention, the second throughput measurement means can measure the throughput between each test data output means and the mobile communication terminal.

According to a fourth aspect of the invention, in the mobile communication terminal test system according to the above-mentioned aspect, the primary test device may further include a first determination unit (14a) that determines whether the control information includes information about the first communication data. The secondary test device may further include a second determination unit (24a) that determines whether the control information includes information about the second communication data. Each of the first communication data processing means and the second communication data processing means may perform the process on the basis of the determination results of the first and second determination units.

According to this structure, in the mobile communication terminal test system according to the fourth aspect of the invention, each of the first communication data processing means and the second communication data processing means can perform the process related to the communication data on the basis of the determination result of the first and second determination units.

According to a fifth aspect of the invention, in the mobile communication terminal test system according to the above-mentioned aspect, the control information may be retransmission request information for requesting the retransmission of communication data which the mobile communication terminal fails to receive. The first communication data processing means may perform a process of retransmitting the communication data which the mobile communication terminal fails to receive in the first communication data. The second communication data processing means may perform a process of retransmitting the communication data which the mobile communication terminal fails to receive in the second communication data.

According to this structure, the mobile communication terminal test system according to the fifth aspect of the invention can perform the process of retransmitting the communication data which the mobile communication terminal fails to receive for each component carrier.

According to a sixth aspect of the invention, in the mobile communication terminal test system according to the above-mentioned aspect, each of the primary test device and the secondary test device may further include synchronization means (12, 22) for synchronizing symbol timing and frame timing of the test signal between the primary test device and the secondary test device.

According to this structure, the mobile communication terminal test system according to the sixth aspect of the invention can synchronize the primary test device and the secondary test device.

According to a seventh aspect of the invention, in the mobile communication terminal test system according to the above-mentioned aspect, the test signal may include a plurality of the secondary component carriers. A plurality of combinations of the secondary test device and the second test data output means may be provided so as to correspond to the plurality of secondary component carriers. The second communication data processing means of the secondary test device may perform the process corresponding to the control information related to the second communication data which is transmitted by a host device among the control information items of the control information.

According to an eighth aspect of the invention, the mobile communication terminal test system according to the above-mentioned aspect may further include a coupler (104) that combines signals from the primary test device and the secondary test device, outputs the combined signal as the test signal to the mobile communication terminal, and distributes the transmission signal from the mobile communication terminal to the primary test device and the secondary test device. The mobile communication terminal may transmit the transmission signal in the uplink formed by a single component carrier. The receiving means of the primary test device and the secondary test device commonly may receive the transmission signal from the mobile communication terminal.

According to a ninth aspect of the invention, there is provided a mobile communication terminal test method for testing a mobile communication terminal using a mobile communication terminal test system (100) which transmits a test signal formed by a plurality of downlink component carriers including a primary component carrier (DL_CC1) and a secondary component carrier (DL_CC2) to the mobile communication terminal (1) to test the mobile communication terminal and includes a primary test device (10) that transmits first communication data including first test data to the mobile communication terminal using the primary component carrier of the test signal, a secondary test device (20) that transmits second communication data including second test data to the mobile communication terminal using the secondary component carrier of the test signal, first test data output means (101) for supplying the first test data to the primary test device, second test data output means (102) for supplying the second test data to the secondary test device, and test parameter setting means (11, 21) for setting test parameters including a frequency of each of the plurality of downlink component carriers and a frequency of an uplink used by the mobile communication terminal to the primary test device and the secondary test device. The mobile communication terminal test method includes: a setting step (S11) of allowing the test parameter setting means to set the test parameters to the primary test device and the secondary test device; a transmitting step (S17) of allowing the primary test device and the secondary test device to transmit the test signal to the mobile communication terminal; a receiving step (S18) of allowing each of the primary test device and the secondary test device to receive a transmission signal including control information which is transmitted by the mobile communication terminal in the uplink; a first communication data processing step (S19) of allowing the primary test device to perform a process corresponding to control information related to the first communication data among control information items of the control information; and a second communication data processing step (S20) of allowing the secondary test device to perform a process corresponding to control information related to the second communication data among the control information items of the control information.

According to this structure, in the mobile communication terminal test method according to the ninth aspect of the invention, the primary test device receives the first test data from the first test data output means and the secondary test device receives the second test data from the second test data output means. Then, the primary test device transmits the first test data to the mobile communication terminal using the primary component carrier and the secondary test device transmits the second test data to the mobile communication terminal using the secondary component carrier.

Therefore, the mobile communication terminal test method according to the ninth aspect of the invention can test the mobile communication terminal, which performs communication using a plurality of component carriers, with a simple structure.

Advantage of the Invention

The invention can provide a mobile communication terminal test system and a mobile communication terminal test method that can test a mobile communication terminal, which performs communication using a plurality of component carriers, with a simple structure.

BEST MODE FOR CARRYING OUT THE INVENTION

Hereinafter, an embodiment of the invention will be described with reference to the drawings.

First, the structure of a mobile communication terminal test system according to an embodiment of the invention will be described.

Figure 1:
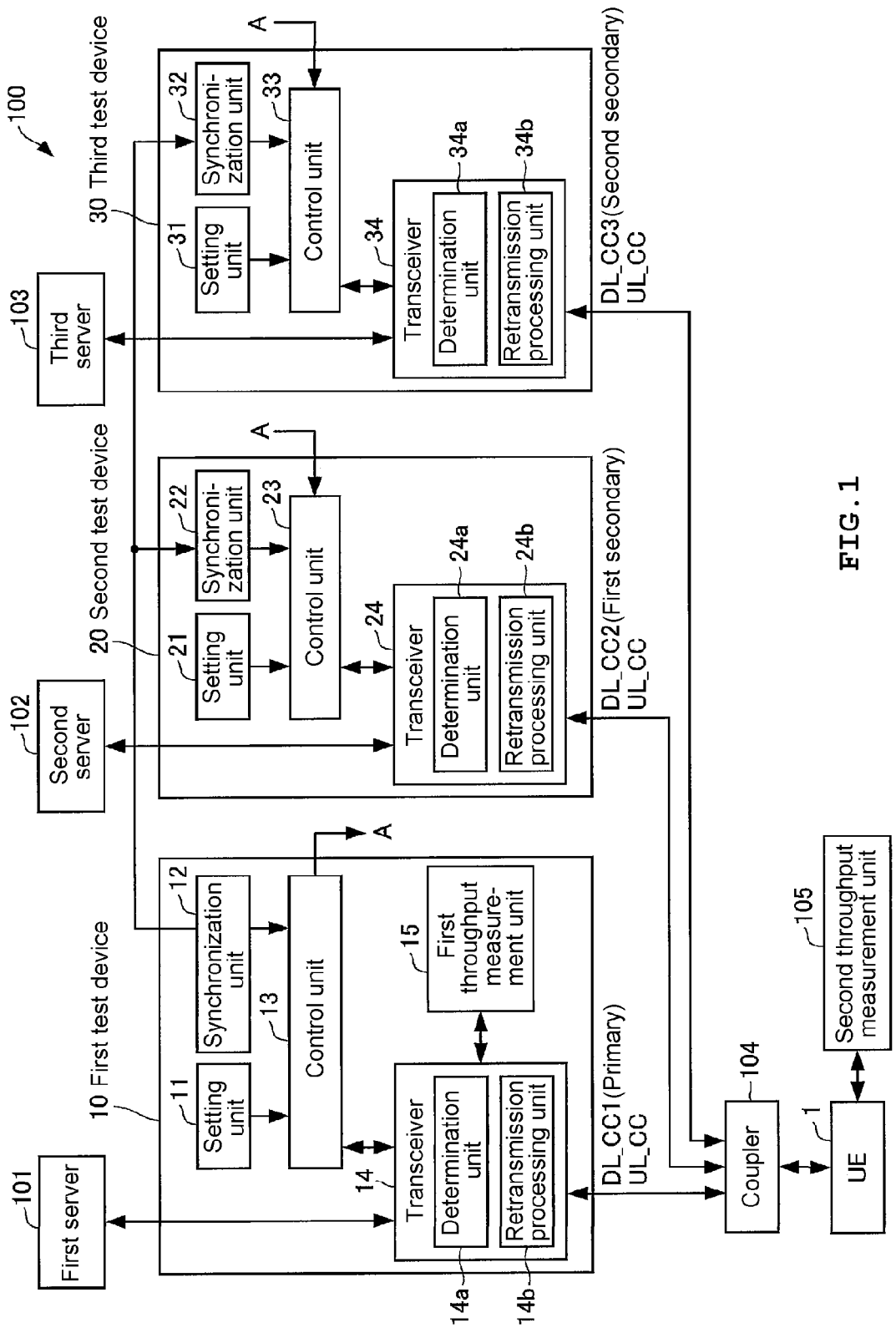
FIG. 1 is a block diagram illustrating an embodiment of a mobile communication terminal test system according to the invention.

As shown in FIG. 1, a mobile communication terminal test system 100 according to this embodiment includes first to third servers 101 to 103, first to third test devices 10 to 30, a coupler 104, and a second throughput measurement unit 105. It is assumed that the mobile communication terminal test system 100 tests a mobile communication terminal (hereinafter, referred to as an "UE") 1 according to LTE-A which is a communication standard. However, for simplicity of description, it is assumed that the mobile communication terminal test system 100 performs communication using a single antenna, not multiple antennas. The first test device 10 forms a primary test device according to the invention. The second test device 20 forms a secondary test device according to the invention. When the mobile communication terminal test system 100 includes a plurality of secondary test devices, the third test device 30 forms one of the secondary test devices.

During a test, the mobile communication terminal test system 100 transmits a test signal formed by a plurality of downlink component carriers including one primary component carrier within a predetermined frequency band and two secondary component carriers within a predetermined frequency band in a downlink from the first to third test devices 10 to 30 to the UE 1. The mobile communication terminal test system 100 uses one component carrier within a predetermined frequency band in an uplink from the UE 1 to the first to third test devices 10 to 30.

The mobile communication terminal test system 100 can perform a test using a plurality of (for example, five) component carriers on the basis of the amount of data in the downlink and the uplink, according to the communication standard LTE-A. However, for simplicity of explanation, an example in which three component carriers are used in the downlink as described above will be described. In the uplink, one component carrier is used.

In the following description, a downlink primary component carrier is represented by DL_CC1, two first and second downlink secondary component carriers are represented by DL_CC2 and DL_CC3, respectively, and an uplink component carrier is represented by UL_CC.

Each of the first to third servers 101 to 103 is, for example, a personal computer (hereinafter, referred to as a "PC"). The first to third servers 101 to 103 have different IP (Internet Protocol) addresses and transmit an IP packet including predetermined test data as IP data to the UE 1 through the first to third test devices 10 to 30. That is, the first to third servers 101 to 103 output a plurality of test data items to the first to third test devices 10 to 30 through different paths, respectively. In the invention, the first server 101 forms first test data output means for supplying first test data to the primary test device. The second server 102 forms second test data output means for supplying second test data to the secondary test device. When the mobile communication terminal test system 100 includes a plurality of second test data output means, the third server 103 forms one of the second test data output means.

The first test device 10 includes a setting unit 11, a synchronization unit 12, a control unit 13, a transceiver 14, and a first throughput measurement unit 15.

The setting unit 11 is, for example, a keyboard or a display and is configured such that the tester operates the keyboard to set test parameters for testing the UE 1. For example, the setting unit 11 is used to set the center frequency of DL_CC1 used by the first test device 10, the center frequency of UL_CC used by the UE 1, the IP addresses of the first to third servers 101 to 103, and the IP address of the UE 1. In addition, the setting unit 11 forms test parameter setting means according to the invention.

The setting unit 11 sets logical channel information of an evolved packet system (EPS) bearer, which is a logical path that is established by each of the first to third test devices 10 to 30 in order to transmit and receive the IP packet to and from the UE 1, so as to be associated with the IP addresses of the first to third servers 101 to 103. A specific quality of service (QoS) level can be set to the EPS bearer and the EPS bearer is associated with a traffic flow template (TFT). The TFT is defined as a set of filter information for identifying a flow, which is communication data. For example, a destination IP address, a port number, or protocol information can be designated in each filter information item. Therefore, the traffic flow of a specific application or a flow with a specific communication partner can be identified by the TFT.

The synchronization unit 12 unifies system clocks among the first to third test devices 10 to 30. For example, the synchronization unit 12 outputs the system clock of the first test device 10 to a synchronization unit 22 of the second test device 20 and a synchronization unit 32 of the third test device 30 to unify the system clocks among the first to third test devices 10 to 30. In addition, the synchronization unit 12 outputs a predetermined control signal to the synchronization units 22 and 32 such that symbol timing and frame timing are synchronized when data is transmitted to and received from the UE 1. As a result, the symbol timings and frame timings of each communication data item output from the first to third test devices 10 to 30 to the UE 1 are synchronized with each other.

The control unit 13 includes, for example, a CPU, a ROM, and a RAM and operates according to a program which is stored in the ROM in advance. The control unit 13 controls the overall operation of the first test device 10. In addition, the control unit 13 communicates with the UE 1 through the transceiver 14 before a test starts and establishes a call connection. At that time, the control unit 13 establishes the EPS bearer between the transceiver 14 of the first test device 10 and the UE 1. Similarly, the control unit 13 exchanges data with the UE 1 so as to establish the EPS bearer between the transceiver 24 of the second test device 20 and the UE 1. The control unit 13 exchanges data with the UE 1 so as to establish the EPS bearer between the transceiver 34 of the third test device 30 and the UE 1. Then, the control unit 13 notifies the UE 1 of the logical channel information of each EPS bearer in association with the IP addresses of the first to third servers 101 to 103.

In this embodiment, the control unit 13 outputs a cell available notification signal for notifying that each cell including DL_CC2 and DL_CC3 can be used to each of the control units 23 and 33.

The transceiver 14 has functions with a hierarchical structure, transmits the IP packet including the test data from the first server 101 as a radio signal to the UE 1, and receives a radio signal including the IP packet from the UE 1. The transceiver 14 forms receiving means according to the invention.

Specifically, the transceiver 14 includes layer 1 (physical layer) and layer 2 (data link layer). Layer 2 includes a packet data convergence protocol (PDCP) layer, a radio link control (RLC) layer, and a media access control (MAC) layer as sub-layers. For example, the PDCP layer keeps user data secret and compresses a header. The RLC layer controls, for example, retransmission in response to an automatic repeat request (ARQ) and the division, combination, and order of a service data unit (SDU). For example, the MAC layer controls retransmission in response to a hybrid-ARQ (HARQ) and schedules the user data. The sub-layers, such as the PDCP layer, the RLC layer, and the MAC layer, are combined with each other by an interface which is called a service access point (SAP). An SAP which connects the MAC layer and the physical layer indicates a transmission channel and an SPA which connects the RLC layer and the MAC layer indicates a logical channel.

The transceiver 14 frequency-converts a baseband signal which is processed by each of the above-mentioned layers and is then output into an RF signal with a predetermined frequency and outputs the RF signal to the UE 1. In addition, the transceiver 14 receives the RF signal with a predetermined frequency from the UE 1, converts the frequency of the RF signal, and outputs a baseband signal such that the baseband signal is processed by each of the above-mentioned layers.

The transceiver 14 includes a determination unit 14a and a retransmission processing unit 14b. The determination unit 14a determines whether reception acknowledgement information which is included in a response signal from the UE 1 is related to communication data transmitted by DL_CC1. The determination unit 14a forms a first determination unit according to the invention. Communication data transmitted by DL_CC1 is referred to as DL_CC1 communication data, communication data transmitted by DL_CC2 is referred to as DL_CC2 communication data, and communication data transmitted by DL_CC3 is referred to as DL_CC3 communication data. In the invention, the DL_CC1 communication data forms first communication data. The DL_CC2 communication data forms second communication data. When the mobile communication terminal test system 100 includes a plurality of secondary test devices, the DL_CC3 communication data forms a portion of the second communication data.

The reception acknowledgement information includes an acknowledgement (ACK) signal or a negative acknowledgement (NACK) signal. The ACK signal is a signal indicating the success of reception which is transmitted from the UE 1 when the UE 1 succeeds in receiving the communication data transmitted to the UE 1. The NACK signal is a signal indicating the failure of reception which is transmitted from the UE 1 when the UE 1 fails in receiving the communication data transmitted to the UE 1. The reception acknowledgement information is associated with DL_CC1, DL_CC2, and DL_CC3.

Here, the determination unit 14a will be described in detail. Since the determination units 24a and 34a have the same structure as the determination unit 14a, the description thereof will be omitted. As described above, in this embodiment, a single antenna is used for communication with the UE 1, that is, communication is performed by a single-input single-output (SISO) system. Here, the description will be made on the assumption that communication is performed by a multiple-input multiple-output (MIMO) system.

An upstream signal from the UE 1 includes communication data and HARQ-ACK information indicating whether a data channel of a downstream signal from the first test device 10 can be demodulated by the UE 1. The HARQ-ACK information includes ACK information and NACK information.

Figures 2, 3:
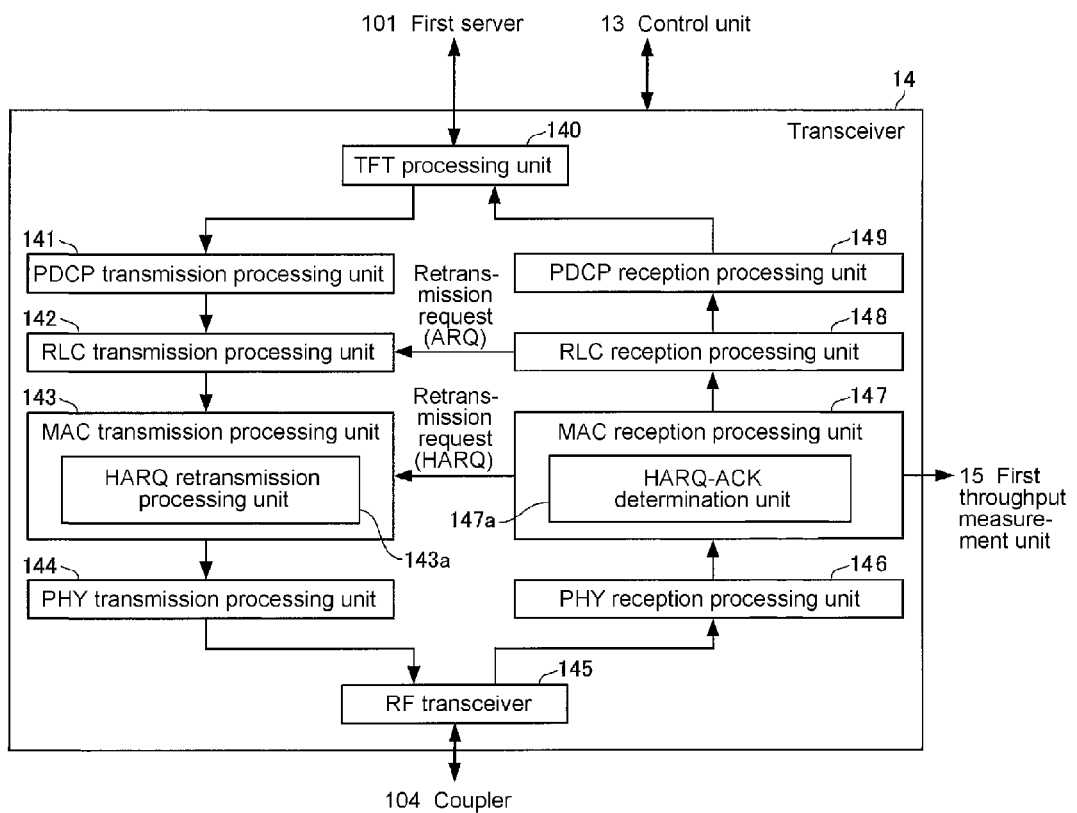
FIG. 2 is a diagram illustrating an example of HARQ-ACK information which is received by a determination unit of a transceiver in the mobile communication terminal test system according to the invention.
FIG. 3 is a block diagram illustrating the detailed structure of the transceiver in the mobile communication terminal test system according to the invention.

FIG. 2 shows an example of the HARQ-ACK information included in the upstream signal when the first test device transmits a downstream signal as a MIMO signal including two component carriers, that is, a primary component carrier and one secondary component carrier, each having two data streams which are multiplexed. In this case, the HARQ-ACK information is 4-bit ACK/NACK information. In FIG. 2, TB1 indicates a first data stream which is transmitted by the MIMO system and TB2 indicates a second data stream which is transmitted by the MIMO system.

The determination unit 14a extracts the HARQ-ACK information addressed to the host device from the received HARQ-ACK information items and transmits the extracted HARQ-ACK information to the retransmission processing unit 14b. When the host device operates as the primary component carrier, the determination unit 14a extracts HARQ-ACK(0) information and HARQ-ACK(1) information.

The HARQ-ACK information varies depending on conditions, such as the number of component carriers, the transmission conditions of the downstream signal (the MIMO system or the SISO system), and whether the communication system of the first test device 10 is a frequency division duplex (FDD) system or a time division duplex (TDD) system. The first test device 10 has a function of constantly extracting the HARQ-ACK information addressed to the host device from the HARQ-ACK information items which vary depending on each condition.

When a DL_CC1 communication data retransmission request signal (for example, a control signal such as ARQ or HARQ) is received from the UE 1, the retransmission processing unit 14b retransmits the corresponding DL_CC1 communication data to the UE 1. The retransmission processing unit 14b forms first communication data processing means according to the invention. FIG. 1 conceptually shows the retransmission function of the retransmission processing unit 14b (24b and 34b). However, in practice, the retransmission process is performed by the RLC layer and the MAC layer.

Next, the detailed structure and operation of the transceiver 14 will be described with reference to FIG. 3. Since the transceivers 24 and 34 have the same structure as the transceiver 14, the description thereof will be omitted.

As shown in FIG. 3, the transceiver 14 includes a TFT processing unit 140 and an RF transceiver 145 and has a transmission system and a reception system formed between the TFT processing unit 140 and the RF transceiver 145. In some cases, for example, setting information from the control unit 13 or control information from the UE 1 is input to each of the components. The control information includes the above-mentioned reception acknowledgement information or the above-mentioned retransmission request signal.

The transceiver 14 includes, as components of the transmission system, a PDCP transmission processing unit 141, an RLC transmission processing unit 142, a MAC transmission processing unit 143, and a physical layer (PHY) transmission processing unit 144. The MAC transmission processing unit 143 includes an HARQ retransmission processing unit 143a.

The transceiver 14 includes, as components of the reception system, a PHY reception processing unit 146, a MAC reception processing unit 147, an RLC reception processing unit 148, and a PDCP reception processing unit 149. The MAC reception processing unit 147 includes an HARQ-ACK determination unit 147a.

The TFT processing unit 140 transmits data to the PDCP processing unit only when IP data from the first server 101 is identical to its filter conditions. The filter conditions include, for example, an IP address, a protocol type, and a port number.

Hereinafter, the operation of the first test device during transmission will be described. The PDCP transmission processing unit 141 adds a PDCP header to data from the TFT processing unit 140 to generate a PDCP packet and outputs the PDCP header to the RLC transmission processing unit 142.

The RLC transmission processing unit 142 adds an RLC header to the PDCP packet from the PDCP transmission processing unit 141 to generate an RLC packet and outputs the RLC packet to the MAC transmission processing unit 143.

The MAC transmission processing unit 143 adds a MAC header including a logical channel ID to the RLC packet received from the RLC transmission processing unit 142 on the basis of the information from the control unit 13 to generate a MAC packet and outputs the MAC packet to the PHY transmission processing unit 144. The HARQ retransmission processing unit 143a of the MAC transmission processing unit 143 performs a retransmission process on the basis of the HARQ-ACK information from the HARQ-ACK determination unit 147a.

The PHY transmission processing unit 144 modulates data of a PHY packet, which is obtained by adding a PHY header to the MAC packet received from the MAC transmission processing unit 143, into an OFDM signal and outputs the OFDM signal as transmission signal data to the RF transceiver 145.

Next, the operation of the first test device 10 during reception will be described. The PHY reception processing unit 146 demodulates an SC-FDMA signal from the RF transceiver 145 and outputs the MAC packet obtained by excluding the PHY header from the PHY packet to the MAC reception processing unit 147. In addition, the PHY reception processing unit 146 extracts the HARQ-ACK information from the SC-FDMA signal and outputs the HARQ-ACK information to the HARQ-ACK determination unit 147a.

The HARQ-ACK determination unit 147a extracts only information about the host component carrier from the HARQ-ACK information received from the PHY reception processing unit 146 on the basis of the information from the control unit 13 and outputs the extracted information to the HARQ retransmission processing unit 143a.

The MAC reception processing unit 147 checks whether the logical channel ID included in the MAC header of the MAC packet is identical to the logical channel ID which is received from the control unit 13 and is used by the MAC reception processing unit 147. Only when the logical channel IDs are identical to each other, the MAC reception processing unit 147 transmits the RLC packet from which the MAC header is excluded to the RLC reception processing unit 148.

The RLC reception processing unit 148 outputs the PDCP packet obtained by excluding the RLC header from the RLC packet to the PDCP reception processing unit 149.

The PDCP reception processing unit 149 excludes the PDCP header from the PDCP packet and outputs data to the TFT processing unit 140.

Figures 4, 5:
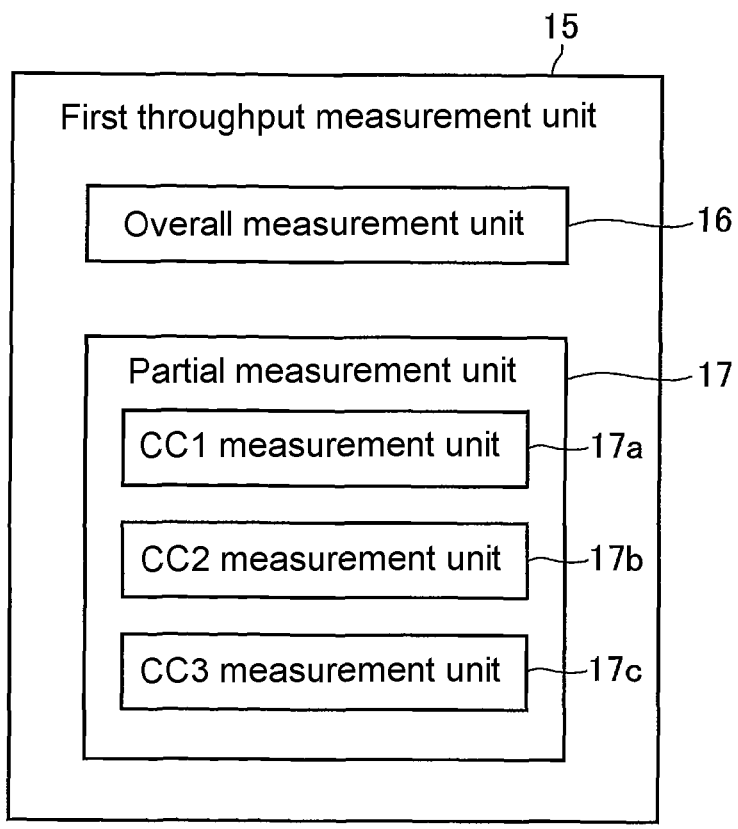
FIG. 4 is a block diagram illustrating an embodiment of a first throughput measurement unit in the mobile communication terminal test system according to the invention.
FIG. 5 is a diagram illustrating an example of the setting of a center frequency of a component carrier in a downlink and an uplink in the mobile communication terminal test system according to the invention.

As shown in FIG. 4, the first throughput measurement unit 15 includes an overall measurement unit 16 and a partial measurement unit 17. The partial measurement unit 17 includes a CC1 measurement unit 17a, a CC2 measurement unit 17b, and a CC3 measurement unit 17c. The first throughput measurement unit 15 forms first throughput measurement means according to the invention.

Each measurement unit of the first throughput measurement unit 15 counts the ACK signal and the NACK signal included in the response signal from the UE 1, counts discontinuous transmission (DTX), and calculates throughput on the basis of [Equation 1]. Here, DTX is detected by the transceiver 14 when the UE 1 does not transmit an ACK/NACK response to the communication data transmitted to the UE 1. The throughput indicates throughput in a radio section in the practical use of the UE 1.

Throughput (bps)=data rate×the count value of the ACK signal/(the count value of the ACK signal+ the count value of the NACK signal+the count value of DTX)     [Equation 1]

Specifically, the overall measurement unit 16 measures the overall throughput from the count value of the ACK signal, the count value of the NACK signal, and the count value of DTX related to the DL_CC1 communication data, the DL_CC2 communication data, and the DL_CC3 communication data on the basis of [Equation 1].

In the partial measurement unit 17, for example, the CC2 measurement unit 17b measures the throughput of the DL_CC2 communication data from the count value of the ACK signal, the count value of the NACK signal, and the count value of DTX related to the DL_CC2 communication data on the basis of [Equation 1]. The CC1 measurement unit 17a and the CC3 measurement unit 17c have the same function as the CC2 measurement unit 17b.

Returning to FIG. 1, the structure of the second test device 20 and the third test device 30 will be described. Since the second test device 20 and the third test device 30 have substantially the same structure as the first test device 10, they will be described briefly.

The second test device 20 includes a setting unit 21, the synchronization unit 22, the control unit 23, and the transceiver 24.

The setting unit 21 is used by the tester to set the test parameters for testing the UE 1. For example, the setting unit 21 is used to set the center frequency of DL_CC2. The setting unit 21 forms test parameter setting means according to the invention.

The synchronization unit 22 unifies the system clocks between the first to third test devices 10 to 30 together with the synchronization units 12 and 32. In addition, the synchronization unit 22 synchronizes the symbol timing and the frame timing together with the synchronization units 12 and 32.

The control unit 23 controls the overall operation of the second test device 20. When a DL_CC2 cell available notification signal is received from the control unit 13, the control unit 23 performs control such that the second test device 20 performs a test which uses a cell of DL_CC2.

The transceiver 24 includes the determination unit 24a and the retransmission processing unit 24b. The determination unit 24a determines whether the reception acknowledgement information included in the response signal from the UE 1 related to the DL_CC2 communication data. The transceiver 24 has functions with a hierarchical structure, transmits an IP packet including test data from the second server 102 as a radio signal to the UE 1, and receives a radio signal including an IP packet from the UE 1. Since each layer of the transceiver 24 has the same structure as that of the transceiver 14, the description thereof will be omitted. The transceiver 24 forms receiving means according to the invention. The determination unit 24a forms a second determination unit according to the invention.

When a DL_CC2 communication data retransmission request signal (for example, a control signal such as ARQ or HARQ) is received from the UE 1, the retransmission processing unit 24b retransmits the corresponding DL_CC2 communication data to the UE 1. The retransmission processing unit 24b forms second communication data processing means according to the invention.

The third test device 30 includes a setting unit 31, the synchronization unit 32, the control unit 33, and the transceiver 34.

The setting unit 31 is used by the tester to set the test parameter for testing the UE 1 and is used to set, for example, the center frequency of DL_CC3. The setting unit 31 forms test parameter setting means according to the invention.

The synchronization unit 32 unifies the system clocks among the first to third test devices 10 to 30 together with the synchronization units 12 and 22. In addition, the synchronization unit 32 synchronizes the symbol timing and the frame timing together with the synchronization units 12 and 22.

The control unit 33 controls the overall operation of the third test device 30. When a DL_CC3 cell available notification signal is received from the control unit 13, the control unit 33 performs control such that the third test device 30 performs a test using a cell of DL_CC3.

The transceiver 34 includes the determination unit 34a and the retransmission processing unit 34b. The determination unit 34a determines whether the reception acknowledgement information included in the response signal from the UE 1 is related to the DL_CC3 communication data. In addition, the transceiver 34 has functions with a hierarchical structure, transmits the IP packet including the test data from the third server 103 as a radio signal to the UE 1, and receives a radio signal including the IP packet from the UE 1. Since each layer of the transceiver 34 has the same structure as that of the transceiver 14, the description thereof will be omitted. The transceiver 34 forms the receiving means according to the invention. The determination unit 34a forms the second determination unit according to the invention.

When a DL_CC3 communication data retransmission request signal (for example, a control signal such as ARQ or HARQ) is received from the UE 1, the retransmission processing unit 34b inserts the corresponding DL_CC3 communication data into an IP packet and retransmits the IP packet to the UE 1. The retransmission processing unit 34b forms the second communication data processing means according to the invention.

The coupler 104 is connected to the UE 1 through, for example, a coaxial cable, transmits each radio signal from the transceivers 14, 24, and 34 to the UE 1, and outputs the radio signal received from the UE 1 to the transceivers 14, 24, and 34.

The second throughput measurement unit 105 is, for example, a PC and checks the cyclic redundancy check (CRC) value of the IP packet which is received and transmitted by the UE 1. When the check result is normal, the second throughput measurement unit 105 counts the count value indicating the size of test data and divides the count value by the time when the test data is downloaded to calculate throughput. The throughput means the amount of test data transmitted per unit time and indicates the throughput of an IP layer. The second throughput measurement unit 105 forms second throughput measurement means according to the invention.

Next, the setting of the center frequency of the component carrier in the downlink and the uplink will be described as an example of the setting of the test parameters by the setting units 11, 21, and 31.

As shown in FIG. 5, the setting units 11, 21, and 31 set different frequencies to the first to third test devices 10 to 30 in the downlink and set a common frequency to the first to third test devices 10 to 30 in the uplink. The setting unit 11 of the first test device 10 sets the center frequency of DL_CC1 in the downlink and sets the center frequency of the common UL_CC in the uplink. The setting unit 21 of the second test device 20 sets the center frequency of DL_CC2 in the downlink and sets the center frequency of the common UL_CC in the uplink. The setting unit 31 of the third test device 30 sets the center frequency of DL_CC3 in the downlink and sets the center frequency of the common UL_CC in the uplink.

Figure 6:
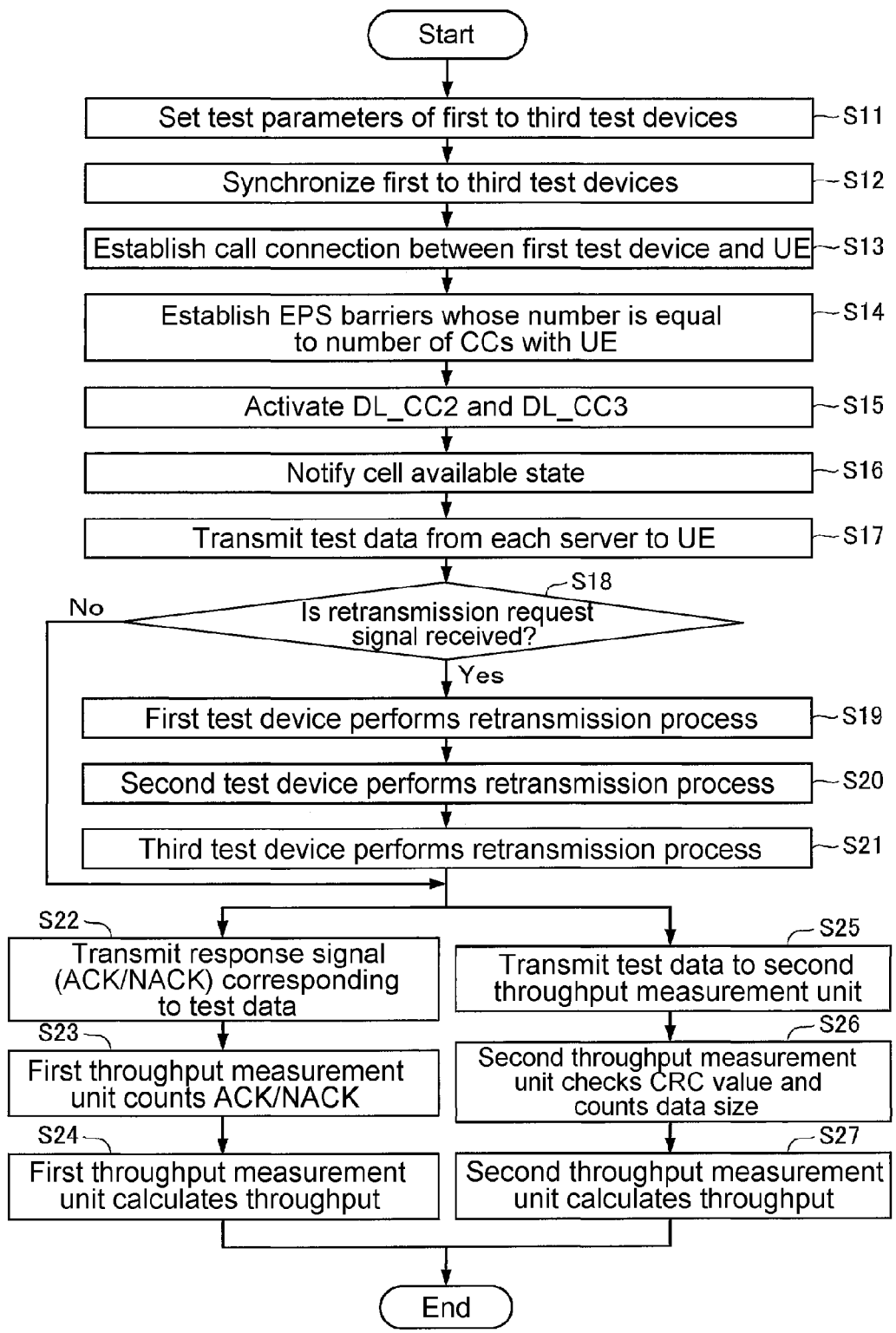
FIG. 6 is a flowchart illustrating an embodiment of the mobile communication terminal test system according to the invention.

Next, the operation of the mobile communication terminal test system 100 according to this embodiment will be described with reference to FIG. 6.

The setting units 11, 21, and 31 set the test parameters of the first to third test devices 10 to 30, respectively (Step S11). Specifically, the setting unit 11 sets, for example, the center frequency of DL_CC1, the center frequency of UL_CC, the IP addresses of the first to third servers 101 to 103, and the IP address of the UE 1. The setting unit 21 sets, for example, the center frequency of DL_CC2. The setting unit 31 sets the center frequency of DL_CC3. Information about the test parameters set by the setting units 11, 21, and 31 is output to the control units 13, 23, and 33.

The synchronization units 12, 22, and 32 perform control such that the system clocks among the first to third test devices 10 to 30 are unified and the symbol timing and the frame timing are unified (Step S12).

The control unit 13 establishes the call connection between the first test device 10 and the UE 1 (Step S13).

The control units 13, 23, and 33 establish EPS bearers whose number is equal to the number of component carriers (CCs) with the UE 1 (Step S14). In this embodiment, the number of CCs is 3.

The control unit 13 activates DL_CC2 and DL_CC3 (Step S15). The order of Step S14 and Step S15 may be reversed.

The control unit 13 outputs a cell available notification signal to the control units 23 and 33 to notify a cell available state indicating that the cells which use DL_CC2 and DL_CC3 can be used (Step S16).

The transceivers 14, 24, and 34 transmit the test data output from the first to third servers 101 to 103 to the UE 1, respectively (Step S17).

The retransmission processing units 14b, 24b, and 34b determine whether a retransmission request signal is received from the UE 1 (Step S18) and perform a retransmission process for the first to third test devices 10 to 30, respectively (Steps S19 to S21).

Specifically, when the determination unit 14a determines that a DL_CC1 communication data retransmission request signal is received from the UE 1, the retransmission processing unit 14b retransmits the corresponding DL_CC1 communication data to the UE 1 (Step S19). When the determination unit 24a determines that a DL_CC2 communication data retransmission request signal is received from the UE 1, the retransmission processing unit 24b retransmits the corresponding DL_CC2 communication data to the UE 1 (Step S20). When it is determined that a DL_CC3 communication data retransmission request signal is received from the UE 1, the retransmission processing unit 34b retransmits the corresponding DL_CC3 communication data to the UE 1 (Step S21). Steps S19 to S21 are not constantly performed in this order, but the order of Steps S19 to S21 may be changed if necessary.

After Steps S19 to S21 or when it is determined in Step S18 that the retransmission request signal is not received from the UE 1, Steps S22 to S24 and Steps S25 to S27 are performed.

That is, the UE 1 receives the DL_CC1 communication data, the DL_CC2 communication data, and the DL_CC3 communication data from the first to third test devices 10 to 30 and transmits response signals corresponding to the received data (Step S22).

The first throughput measurement unit 15 counts the ACK signal and the NACK signal included in the response signal from the UE 1 (Step S23) and calculates throughput (Step S24).

The UE 1 receives the DL_CC1 communication data, the DL_CC2 communication data, and the DL_CC3 communication data from the first to third test devices 10 to 30 and transmits the received data to the second throughput measurement unit 105 (Step S25).

The second throughput measurement unit 105 checks the CRC value of the IP packet in each of the transmitted test data items and counts a count value indicating the size of the test data when the CRC value is normal (Step S26). Then, the second throughput measurement unit 105 divides the count value by the download time of the test data to calculate throughput (Step S27).

As described above, in the mobile communication terminal test system 100 according to this embodiment, the first test device 10, the second test device 20, and the third test device 30 receive the test data from the first server 101, the second server 102, and the third server 103 through different paths, respectively. The first test device 10 transmits the test data to the UE 1 using DL_CC1 and the second test device 20 and the third test device 30 transmit the test data to the UE 1 using DL_CC2 and DL_CC3. Therefore, it is possible to test the UE 1, which performs communication using a plurality of component carriers, with a simple structure.

In the above-described embodiment, three servers are given as an example of a plurality of test data output means. However, the invention is not limited thereto. For example, three network interfaces with different addresses may be provided in one PC and the test data may be transmitted to the UE 1. In this case, the same effect as described above is obtained.

In addition, three servers may be virtually provided in each test device.

In the above-described embodiment, the setting unit is provided in each test device. However, the invention is not limited thereto. For example, one PC may be connected to each test device by a general purpose interface bus (GPIB) or a local area network and may set the test parameters to each test device. In this case, the same effect as described above is obtained.

In the above-described embodiment, the UE 1 may have the functions of the second throughput measurement unit 105. For example, an application which has the functions of the second throughput measurement unit 105 may be installed in the UE 1. In this case, the UE 1 can measure throughput.

In the above-described embodiment, the mobile communication terminal test system 100 may include only one of the first throughput measurement unit 15 and the second throughput measurement unit 105.

INDUSTRIAL APPLICABILITY

As described above, the mobile communication terminal test system and the mobile communication terminal test method according to the invention can test the mobile communication terminal, which performs communication using a plurality of component carriers, with a simple structure and are useful as a mobile communication terminal test system and a mobile communication terminal test method that test a mobile communication terminal which performs communication using a plurality of component carriers.

DESCRIPTION OF REFERENCE NUMERALS AND SIGNS

10: FIRST TEST DEVICE (PRIMARY TEST DEVICE)
11, 21, 31: SETTING UNIT (TEST PARAMETER SETTING MEANS)
12, 22, 32: SYNCHRONIZATION UNIT
13, 23, 33: CONTROL UNIT
14, 24, 34: TRANSCEIVER (RECEIVING MEANS)
14a: DETERMINATION UNIT (FIRST DETERMINATION UNIT)
14b: RETRANSMISSION PROCESSING UNIT (FIRST COMMUNICATION DATA PROCESSING MEANS)
15: FIRST THROUGHPUT MEASUREMENT UNIT (FIRST THROUGHPUT MEASUREMENT MEANS)
16: ENTIRE MEASUREMENT UNIT
17: PARTIAL MEASUREMENT UNIT
17a: CC1 MEASUREMENT UNIT
17b: CC2 MEASUREMENT UNIT
17c: CC3 MEASUREMENT UNIT
20: SECOND TEST DEVICE (SECONDARY TEST DEVICE)
24a, 34a: DETERMINATION UNIT (SECOND DETERMINATION UNIT)
24b, 34b: RETRANSMISSION PROCESSING UNIT (SECOND COMMUNICATION DATA PROCESSING MEANS)
30: THIRD TEST DEVICE (SECONDARY TEST DEVICE)
100: MOBILE COMMUNICATION TERMINAL TEST SYSTEM
101: FIRST SERVER (FIRST TEST DATA OUTPUT MEANS)
102: SECOND SERVER (SECOND TEST DATA OUTPUT MEANS)
103: THIRD SERVER (SECOND TEST DATA OUTPUT MEANS)
104: COUPLER
105: SECOND THROUGHPUT MEASUREMENT UNIT (SECOND THROUGHPUT MEASUREMENT MEANS)

What is claimed is:

1. A mobile communication terminal test system that transmits a test signal formed by a plurality of downlink component carriers including a primary component carrier and a secondary component carrier to a mobile communication terminal to test the mobile communication terminal, comprising:
a primary test device that transmits first communication data including first test data to the mobile communication terminal using the primary component carrier of the test signal;
a secondary test device that transmits second communication data including second test data to the mobile communication terminal using the secondary component carrier of the test signal;
first test data output means for supplying the first test data to the primary test device;
second test data output means for supplying the second test data to the secondary test device; and
test parameter setting means for setting test parameters including a frequency of each of the plurality of downlink component carriers and a frequency of an uplink used by the mobile communication terminal to the primary test device and the secondary test device,
wherein each of the primary test device and the secondary test device includes receiving means for receiving a transmission signal including control information which is transmitted by the mobile communication terminal in the uplink,
the primary test device includes first communication data processing means for performing a process corresponding to control information related to the first communication data among control information items of the control information, and
the secondary test device includes second communication data processing means for performing a process corresponding to control information related to the second communication data among the control information items of the control information.

2. The mobile communication terminal test system according to claim 1,
wherein the mobile communication terminal transmits, as the control information, reception acknowledgement information corresponding to a received state of the first communication data and the second communication data, and
the primary test device further includes first throughput measurement means for measuring the overall throughput of the first communication data and the second communication data in a physical layer or the throughput of each downlink component carrier on the basis of the reception acknowledgement information transmitted by the mobile communication terminal.

3. The mobile communication terminal test system according to claim 1, further comprising:
second throughput measurement means that receives the first test data and the second test data transmitted from the mobile communication terminal, performs a check process related to the transmitted test data items, and measures throughput between the first and second test data output means and the mobile communication terminal.

4. The mobile communication terminal test system according to claim 1,
wherein the primary test device further includes a first determination unit that determines whether the control information includes information about the first communication data,
the secondary test device further includes a second determination unit that determines whether the control information includes information about the second communication data, and
each of the first communication data processing means and the second communication data processing means performs the process on the basis of the determination results of the first and second determination units.

5. The mobile communication terminal test system according to claim 1,
wherein the control information is retransmission request information for requesting the retransmission of communication data which the mobile communication terminal fails to receive,
the first communication data processing means performs a process of retransmitting the communication data which the mobile communication terminal fails to receive in the first communication data, and
the second communication data processing means performs a process of retransmitting the communication data which the mobile communication terminal fails to receive in the second communication data.

6. The mobile communication terminal test system according to claim 1,
wherein each of the primary test device and the secondary test device further includes synchronization means for synchronizing symbol timing and frame timing of the test signal between the primary test device and the secondary test device.

7. The mobile communication terminal test system according to claim 1,
wherein the test signal includes a plurality of the secondary component carriers,
a plurality of combinations of the secondary test device and the second test data output means are provided so as to correspond to the plurality of secondary component carriers, and
the second communication data processing means of the secondary test device performs the process corresponding to the control information related to the second communication data which is transmitted by a host device among the control information items of the control information.

8. The mobile communication terminal test system according to claim 1, further comprising:
a coupler that combines signals from the primary test device and the secondary test device, outputs the combined signal as the test signal to the mobile communication terminal, and distributes the transmission signal from the mobile communication terminal to the primary test device and the secondary test device,
wherein the mobile communication terminal transmits the transmission signal in the uplink formed by a single component carrier, and
the receiving means of the primary test device and the secondary test device commonly receive the transmission signal from the mobile communication terminal.

9. A mobile communication terminal test method for testing a mobile communication terminal using a mobile communication terminal test system which transmits a test signal formed by a plurality of downlink component carriers including a primary component carrier and a secondary component carrier to the mobile communication terminal to test the mobile communication terminal and includes a primary test device that transmits first communication data including first test data to the mobile communication terminal using the primary component carrier of the test signal, a secondary test device that transmits second communication data including second test data to the mobile communication terminal using the secondary component carrier of the test signal, first test data output means for supplying the first test data to the primary test device, second test data output means for supplying the second test data to the secondary test device, and test parameter setting means for setting test parameters including a frequency of each of the plurality of downlink component carriers and a frequency of an uplink used by the mobile communication terminal to the primary test device and the secondary test device, the method comprising:
a setting step (S11) of allowing the test parameter setting means to set the test parameters to the primary test device and the secondary test device;
a transmitting step (S17) of allowing the primary test device and the secondary test device to transmit the test signal to the mobile communication terminal;
a receiving step (S18) of allowing each of the primary test device and the secondary test device to receive a transmission signal including control information which is transmitted by the mobile communication terminal in the uplink;
a first communication data processing step (S19) of allowing the primary test device to perform a process corresponding to control information related to the first communication data among control information items of the control information; and
a second communication data processing step (S20) of allowing the secondary test device to perform a process corresponding to control information related to the second communication data among the control information items of the control information.

10. The mobile communication terminal test method according to claim 9, further comprising:
a first throughput measurement step (S24),
wherein the mobile communication terminal transmits, as the control information, reception acknowledgement information corresponding to a received state of the first communication data and the second communication data, and
in the first throughput measurement step, the primary test device measures the overall throughput of the first communication data and the second communication data in a physical layer or the throughput of each downlink component carrier on the basis of the reception acknowledgement information transmitted by the mobile communication terminal.

11. The mobile communication terminal test method according to claim 9, further comprising:
a second throughput measurement step (S27) of receiving the first test data and the second test data transmitted from the mobile communication terminal, performing a check process related to the transmitted test data items, and measuring throughput between the first and second test data output means and the mobile communication terminal.

12. The mobile communication terminal test method according to claim 9, further comprising:
a first determination step of allowing the first primary test device to determine whether the control information includes information about the first communication data; and
a second determination step of allowing the secondary test device to determine whether the control information includes information about the second communication data,
wherein each of the first and second communication data processing steps performs the process on the basis of the determination results of the first and second determination steps.

13. The mobile communication terminal test method according to claim 9,
wherein the control information is retransmission request information for requesting the retransmission of communication data which the mobile communication terminal fails to receive,
the first communication data processing step performs a process of retransmitting the communication data which the mobile communication terminal fails to receive in the first communication data, and
the second communication data processing step performs a process of retransmitting the communication data which the mobile communication terminal fails to receive in the second communication data.

14. The mobile communication terminal test method according to claim 9, further comprising:

a synchronization step (S12) of synchronizing symbol timing and frame timing of the test signal between the primary test device and the secondary test device.

15. The mobile communication terminal test method according to claim 9,
wherein the test signal includes a plurality of the secondary component carriers,
the mobile communication terminal test system includes a plurality of combinations of the secondary test device the second test data output means corresponding to the plurality of secondary component carriers, and
the second communication data processing step performs the process corresponding to control information related to the second communication data which is transmitted by the secondary test device among the control information items of the control information.

16. The mobile communication terminal test method according to claim 9,
wherein the mobile communication terminal test system further includes a coupler that combines signals from the primary test device and the secondary test device, outputs the combined signal as the test signal to the mobile communication terminal, and distributes the transmission signal from the mobile communication terminal to the primary test device and the secondary test device,
the mobile communication terminal transmits the transmission signal in the uplink formed by a single component carrier, and
in the receiving step, the primary test device and the secondary test device commonly receive the transmission signal from the mobile communication terminal.

* * * * *